(12) United States Patent
Sasama

(10) Patent No.: US 7,474,425 B2
(45) Date of Patent: Jan. 6, 2009

(54) PRINTING SYSTEM, PRINTING APPARATUS, PRINTING SERVER AND PRINTING METHOD UTILIZING WIRELESS COMMUNICATION

(75) Inventor: Kazuo Sasama, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1044 days.

(21) Appl. No.: 10/378,817

(22) Filed: Mar. 5, 2003

(65) Prior Publication Data
US 2004/0174557 A1    Sep. 9, 2004

(51) Int. Cl.
G06F 15/00 (2006.01)
G06K 1/00 (2006.01)
G01C 21/30 (2006.01)
H04N 1/00 (2006.01)

(52) U.S. Cl. ............... 358/1.15; 358/403; 358/1.16
(58) Field of Classification Search ............. 358/1.1, 358/1.9, 1.11–1.18, 403; 709/223, 200; 379/100.12; 455/3.06; 701/209; 340/995.1; 715/205
See application file for complete search history.

(56) References Cited

U.S. PATENT DOCUMENTS 5,862,321 A * 1/1999 Lamming et al. .......... 709/200
6,894,792 B1 * 5/2005 Abe ....................... 358/1.15
2001/0053301 A1   12/2001 Nishii

FOREIGN PATENT DOCUMENTS

JP   10-016355 A   1/1998

* cited by examiner

Primary Examiner—Dov Popovici
Assistant Examiner—Thierry L Pham
(74) Attorney, Agent, or Firm—Foley & Lardner LLP

(57) ABSTRACT

In a printing system built on a predetermined network, a printing apparatus receives a print job requested by a print request terminal via a printing server and processes the print job, thus performing printing corresponding to the print job. The printing server comprise a first-in first-out type of server-side job buffer portion in which a server-side queue for print jobs is formed to temporality memorize print jobs in the order of arrival of the print jobs requested by the print request terminal and a server-side buffer control portion for changing the order of the print jobs memorized in the server-side queue in response to an order change request signal coming from the printing apparatus. The printing apparatus comprises an event detection portion and an order change request portion. Print jobs read out from the server-side job buffer portion in the order of the print jobs memorized in the server-side queue are transmitted to the printing apparatus.

15 Claims, 7 Drawing Sheets

NAME PLATE

PRINTING SYSTEM, PRINTING APPARATUS, PRINTING SERVER AND PRINTING METHOD UTILIZING WIRELESS COMMUNICATION

BACKGROUND OF THE INVENTION

1. Field of the Invention

The present invention relates to a printing system, printing apparatus, printing server and printing method, which are preferable applied to, for example, a system in which documents are printed by way of a network utilizing short-range wireless communication.

2. Description of related art

Conventionally, in a printing network 9 shown in FIG. 2, in cases where a printing server 10 is utilized for printing, both of a print job PJ1 and print job data PD1 are sent to the printing server 10 from a client terminal 11 handled by a user U1, so that the printing can be requested.

The print job, which is an aggregation of pieces of control for controlling jobs in relation to printing and for managing jobs, includes the name of a job and restrictions posing on resources utilized in performing the job, for example. The print job data is data itself (for example, image data) printed on pieces of paper during a printing process executed on the print job.

Under the control of one printing server 10, there are provided one or more printers (refer to a printer 12). In response to reception of both a print job (for example, PJ1) and print job data (for example, PD1), the printer 12 performs processing for the printing.

However, the number of printers (i.e., the printer 12 in this example) that can be placed under the control of the printing server 10 is limited to a certain number and the printing capacity provided by the printer has a limitation. Therefore, there is a possibility that the printer receives at a time more requests than the printer can handle per time. To handle jobs in harmony with progress in printing carried out by the printers 12, it is required that the printer server 10 has a queue for print jobs (i.e., print queue) that allows the jobs to be processed one by one in sequence.

Such a relationship between the printer server 10 and the printer 12 is true of the relationship between a printing function and a control function (not shown) established within the printer 12. Thus, a print queue can be formed in the printer 12.

To make a distinction between a print queue formed in the printer 12 and a print queue formed in the printer 12, the former is called server-side print queue SQ1 and the latter is called printer-side print queue SQ2, respectively.

The print job data PD1 is stored temporarily in a spooler SP1 in the printing server 10, and stored temporarily in a spooler SP2 in the printer 12.

The print jobs in the queue are normally read out and processed in order of the print jobs lactated in the queue. Accordingly, when taking notice of one print job PJ1 that has received a print request, the process of the print job PJ1 normally proceeds as follows.

When the print job PJ1 is transmitted from the client terminal 11 to the printing server 10, the print job PJ1 is added to the end of the server-side print queue SQ1. In cases where all of the print jobs which have already been present in the server-side print queue SQ1 before the addition of the print job PJ1 are read out and the print job PJ1 becomes the head of the queue SQ1, the print job PJ1 can be subjected to reading. The read-out the print job PJ1 is sent to the printer 12. When received by the printer 12, the print job PJ1 is placed at the end of the printer-side print queue SQ2. In the case that all of the print jobs which have already been present in the printer-side print queue SQ2 before the addition of the print job PJ1 are read out and the print job PJ1 becomes the head of the queue SQ2, the print job PJ1 can be subjected to reading. When the print job PJ1 is read out, the contents of the print data PD1 specified by the print job PJ1 is finally printed and outputted.

Thus, the user S1, who made the print request, moves to the printer 12 at the proper time when it is expected that a series of processes relating to the print job PJ1 and print data PD1 have been finished to complete the print output, and can obtain the printed output results.

Making use of the printing server 10 gives the client terminal 11 one advantage that the client terminal 11 is released from a load concerning the print processing once the terminal issued a print request. In addition, the presence of the printing server 10 gives the user Ul another advantage of being able to use the printer 12 under the control of the printer server 10 as if the printer 12 were a printer (not shown) connected directly to the client terminal 11 itself. The latter advantage is effective for a situation where a limited number of printers (for example, the printer 12 shown in this example) are used in common by many users.

It is however rare that the number of client terminals under the control of the printer server 10 is one. Namely it is usual that lots of client terminals are placed. In addition, each of the users, who are in charge of operating plural such client terminals, operates each client terminal to dynamically issue print requests on the basis of each user's actions. It is therefore difficult to each user Ul to finely predict timing of print output related to the print job PJ1 and print job data PD1.

If a predicted time is too early or in the event that it is desired to obtain results of print output as quickly as possible, there is a possibility that the user U1 is forced to wait in front of the printer 12 for a long time.

Some types of printer 12 provide a control panel 12A that can be operated by the user U1 so that the print job PJ1 is changed to a more ascendant ranking in the printer-side print queue SQ2. However, even in such a case, it is general that the print job PJ1 in the printer-side print queue SQ2 cannot be changed to locate at the head of the queue SQ2.

On top of that, the above order change is permitted under a limited situation where the print job PJ1 has already been put in the printer-side print queue SQ2. In cases where the print job PJ1 sill remains in the server-side print queue SQ1, even the change of the order cannot be permitted, thus lowering convenience and flexibility.

SUMMARY OF THE INVENTION

The present invention has been made in view of the above circumstances, and an object of the present invention is, therefore, to provide a printing system, printing apparatus, printing server and printing method with enhanced convenience and flexibility.

In a first invention, there is provided a printing system built on a predetermined network in which a printing apparatus receives a print job requested by a print request terminal via a printing server and processes the print job, thus performing printing corresponding to the print job, wherein the printing server comprise: a first-in first-out type of server-side job buffer portion in which a server-side queue for the print job is formed to temporality memorize the print job in the order of arrival of the print job requested by the print request terminal; and a server-side buffer control portion for changing the order of the print job memorized in the server-side queue in response to an order change request signal coming from the printing apparatus, wherein the printing apparatus comprises:

an event detection portion for detecting an occurrence of a predetermined event; and an order change request portion for transmitting the order change request signal in cases where the event detection portion detects the event, whereby the print job read out from the server-side job buffer portion in the order of the print job memorized in the server-side queue is transmitted to the printing apparatus.

In a second invention, there is a printing apparatus, operable in a predetermined network, for receiving from a printing server a print job sent from a print request terminal to the printing server and performing printing corresponding to the print job, the printing apparatus comprise: an event detection portion for detecting an occurrence of a predetermined event; and an order change request portion for transmitting an order change request signal in cases where the event detection portion detects the event, whereby the order change request signal is used to change the order of the print order memorized in a serer-side queue.

Furthermore, in a third invention, there is provided a printing method, operable in a predetermined network, by which a printing apparatus receives a print job requested by a print request terminal via a printing server and processes the print job, thus performing printing corresponding to the print job, the printing method comprising the steps of: in the printing server, the printing server memorize temporarily the print job requested by the print request terminal into a first-in first-out type of server-side job buffer portion in the order of arrival of the print job, whereby a server-side queue for the print job is formed; in the printing apparatus, the printing apparatus transmits an order change request signal from an order change request portion in cases where an event detection portion detects a predetermined event; and in the printing server that receives the order change request signal, a server-side control portion changes the order of the print job memorized in the server-side queue in response to the order change request signal and transmits to the printing apparatus a particular print job read from the print job memorized in the server-side job buffer portion in the changed order of the print job.

In a fourth invention, there is provided a printing server, operable in a predetermined network, for memorizing temporarily a print job requested by a print request terminal and supplying the print job to a printing apparatus to make the printing apparatus perform printing corresponding the print job, the printing server comprising: a first-in first-out type of server-side job buffer portion in which a server-side queue for the print job is formed to temporality memorize the print job in the order of arrival of the print job requested by the print request terminal; and a server-side buffer control portion for changing the order of the print job memorized in the server-side queue in response to an order change request signal coming from the printing apparatus, thereby transmitting to the printing apparatus the print job read out from the server-side job buffer portion in the order of the print job memorized in the server-side queue.

DETAILED DESCRIPTION OF PREFERRED EMBODIMENT

Referring to the accompanying drawings, a printing system, printing apparatus, printing server, and printing method according to a preferred embodiment of the present invention will now be explained.

Figure 1:
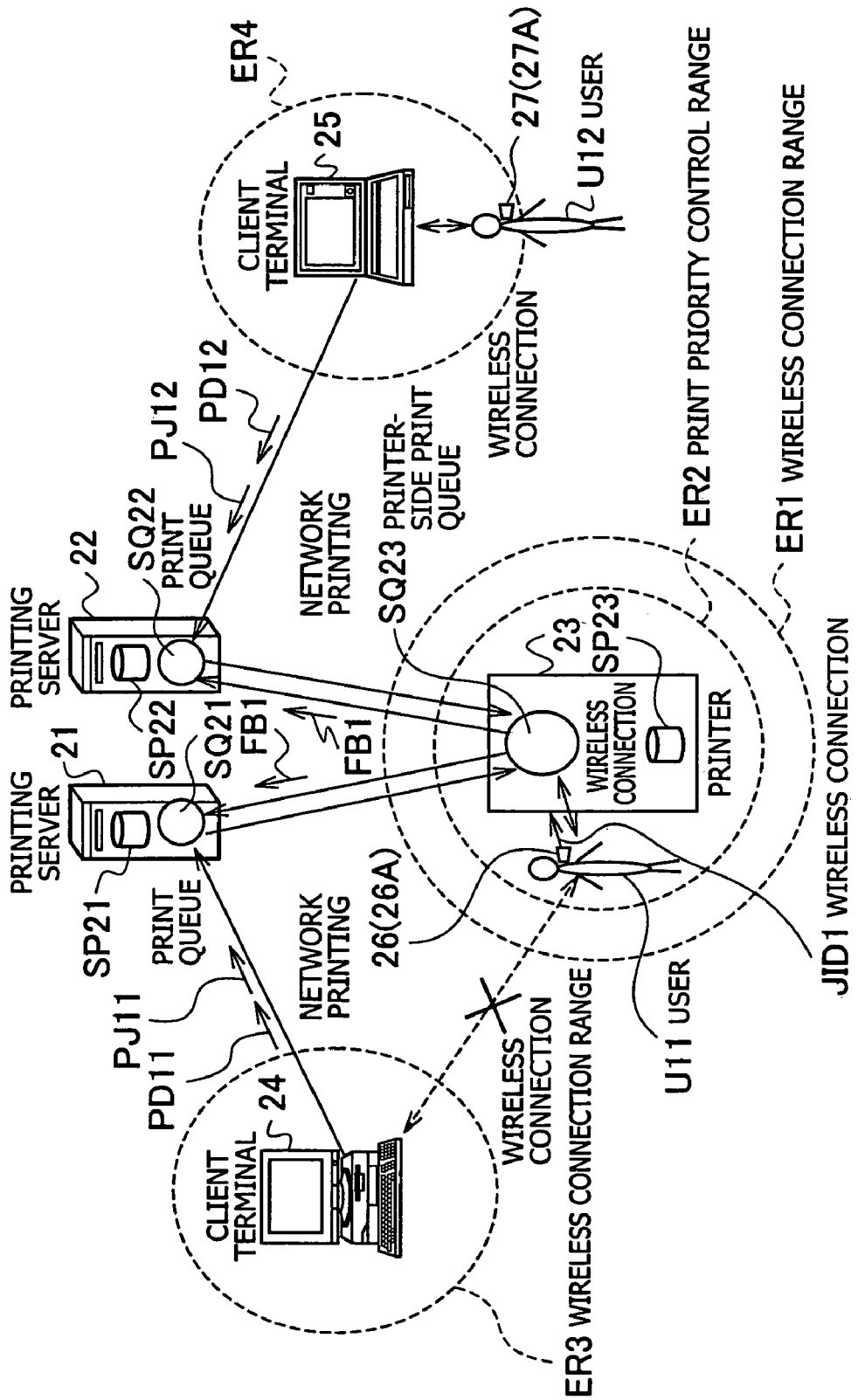
FIG. 1 is a schematic view exemplifying the entire configuration of a printing system according to an embodiment of the present invention.

An example of the entire configuration of a printing network 20 according to the present embodiment is shown in FIG. 1.

In FIG. 1, the printing network 20 is provided with printing servers 21 and 22, a printer 23, client terminals 24 and 25, and name plates 26 and 27.

The printing network 20 may be of a network that includes, if needed, a WAN (Wide Area Network) such as the Internet, but in most cases, is made up of a LAN (Local Area Network) built internally in one company or others.

In addition, in the case of the configuration shown in the figure, though the printing servers and the client terminals, which are placed on the printing network 20, are two in number, respectively, the number of those devices may be one or three or more. Preferably, it is usual that the number of client terminals is far more than two shown in the figure.

It is also natural that the number of printers is more than one, which is illustrated in the figure.

In the example shown in the figure, one client terminal (for example, the terminal 24) is connected to one printing server (for example, the server 21), but it is possible to employ the configuration in which one client terminal is connected to two or more printing servers. Furthermore, the example shown in the figure concentrates on expressing the relationship of logical connections among the components, so that the relationship of physical connections is not limited to the connections shown in the figure. Still further, it is natural that the printing network 20 may include not merely network-related devices (such as hubs, L2 switches, and routers) but also various types of servers (such as DNS servers, DHS servers), though they are not shown in the figure.

Figure 2:
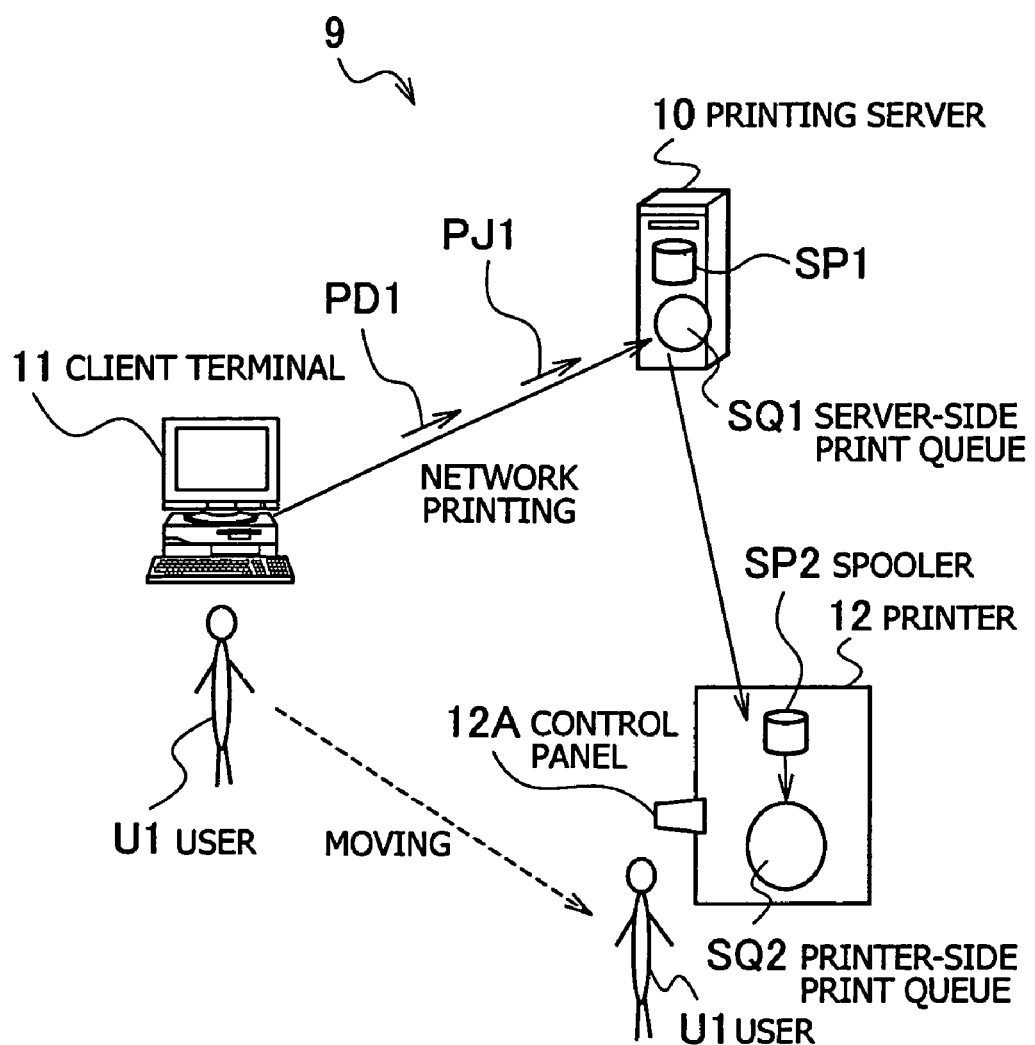
FIG. 2 is a schematic view showing the entire configuration of a conventionally used printing system.

In the printing network 20, in cases where a user U11 who operates the client terminal (for instance, the terminal 24) desires to print any data (for example, document data), the user requests for printing by providing the printing server 21 with both of a print job (for example, a job PJ11) and print data (PD11), which are then supplied to the printer 23 via the printer server 21, thereby the printer 23 outputting printed results. From this point of view, the printing network 20 is basically similar in handling to the printing network 9 illustrated in FIG. 2.

Accordingly, a server-side print queue SQ21 that corresponds to the foregoing print queue SQ1 is formed in the printing server 21, another server-side print queue SQ21 that corresponds to the foregoing print queue SQ1 is formed in the printing server 22, and another printer-side print queue SQ23 that corresponds to the foregoing queue SQ2 is formed in the printer 23, respectively.

In addition, a spooler SP21 that corresponds to the forgoing spooler SP1 is present in the printing server 21, another spooler SP22 that corresponds to the forgoing spooler SP1 is present in the printing server 22, and another spooler SP23 that corresponds to the forgoing spooler SP2 is present in the printing server 23, respectively.

Although the printer 23 is formed as a communication apparatus that has a function (printing function) for processing both a print job and print job data that have been arrived via the network for providing printed outputs, but the printer 23 may have a copying function, if needed.

Figure 4:
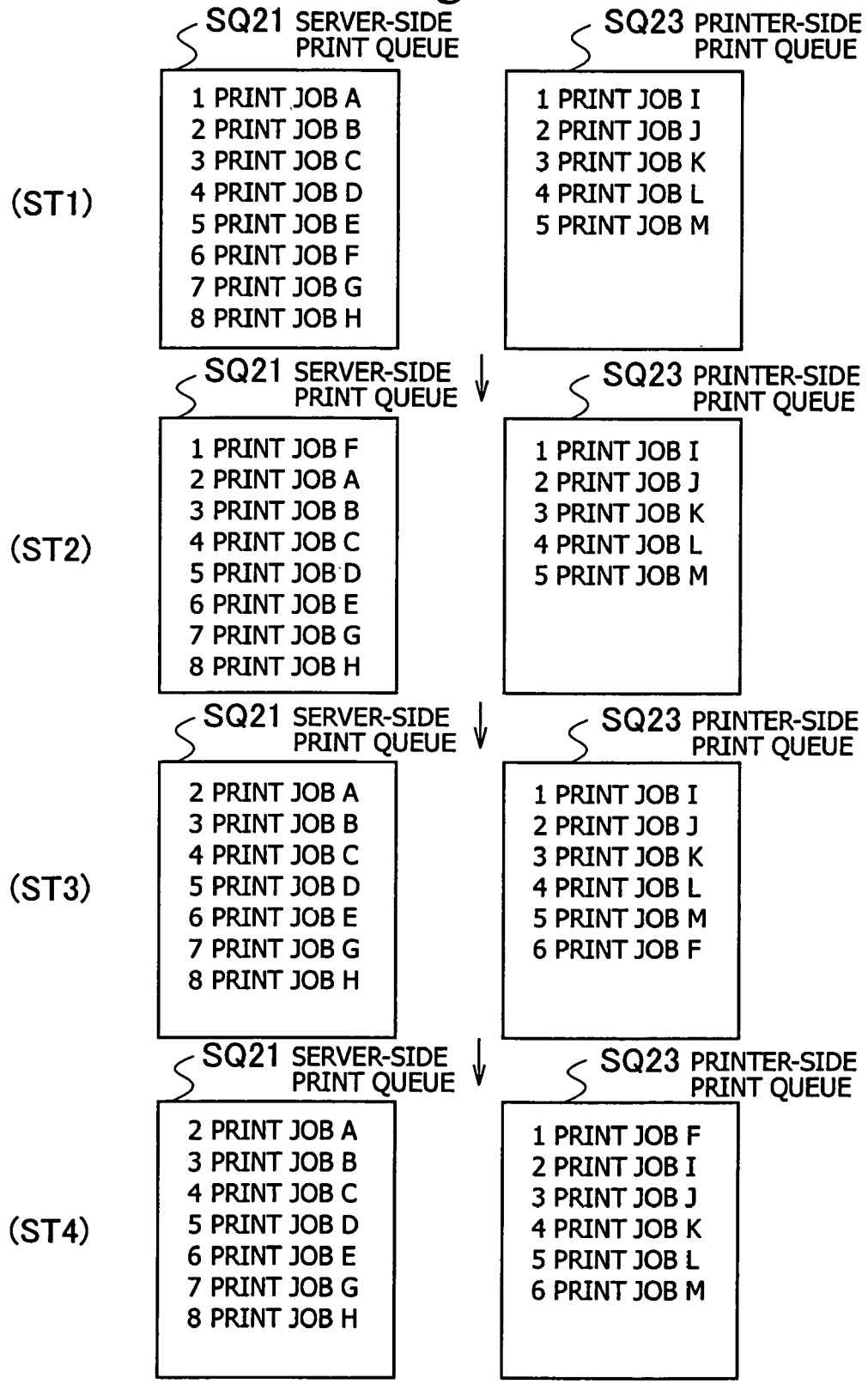
FIG. 4 illustrates the operation carried out in the embodiment according to the present invention.

When the printing network 20 is in operation, both of the server-side print queue SQ1 and the printer-side print queue SQ23 are able to have a certain status (for example, a status ST1), which is shown in FIG. 4.

For instance, in the status ST1, print jobs A to H are included in the server-side print queue SQ21 in the alphabetical order of A, B, C, . . . , H. As a result, a print job which should be read out by the next reading from the print queue SQ21 in this status is normally the print job A. Similarly, the print queue SQ23 in this status ST1 is composed of print jobs I to M that line up in the order of alphabets. Thus, a print job which should be read out by the next reading from the print queue SQ23 in this status is normally the print job I.

Additionally to the above normal reading, processing inherent to the present embodiment makes it possible to change print jobs to be read out by the next reading from each of the print queues SQ1 to SQ2.

Figure 5:
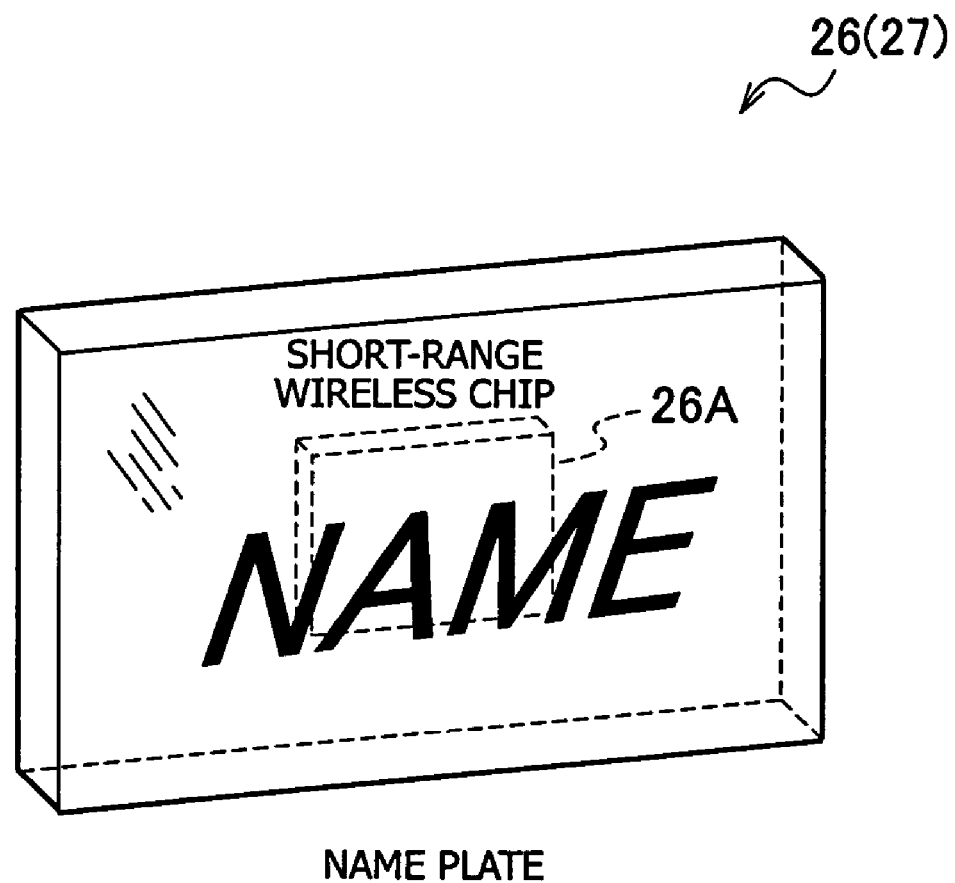
FIG. 5 is a schematic view exemplifying the outer configuration of a name plate used in the embodiment of the present invention.

The name plates 26 and 27 are components typical of the present embodiment. Each name plate has normally an outer view formed into a name tag, as shown in FIG. 5, and is provided to have a short-range wireless communication function (i.e., a short-range wireless terminal 26A or 27A) realized by mounting an IC chip and others within each name plate. For instance, if the users U11 and U12 are employees of a certain company, a division to which each user belongs and each user's name are displayed on each name plate 26 (27).

Because the short-range wireless terminal (for example, the terminal 26A) is incorporated with the name plate, the terminal is put on user's clothes or others (for instance, the clothes or others of the user U11) and is moved as the user moves. Communication terminals subjected to the short-range wireless communication with the short-range wireless terminal are the printer 23 and a client terminal (for example, the terminal 24). Such a client terminal is, however, limited to the terminal operated by the user.

In the configuration shown in FIG. 1, the client terminal 24 is to be operated by the user U11 and the client terminal 25 is to be operated by the user U12, while the printer 23 is to be shared by both users U11 and U12.

Figure 6:
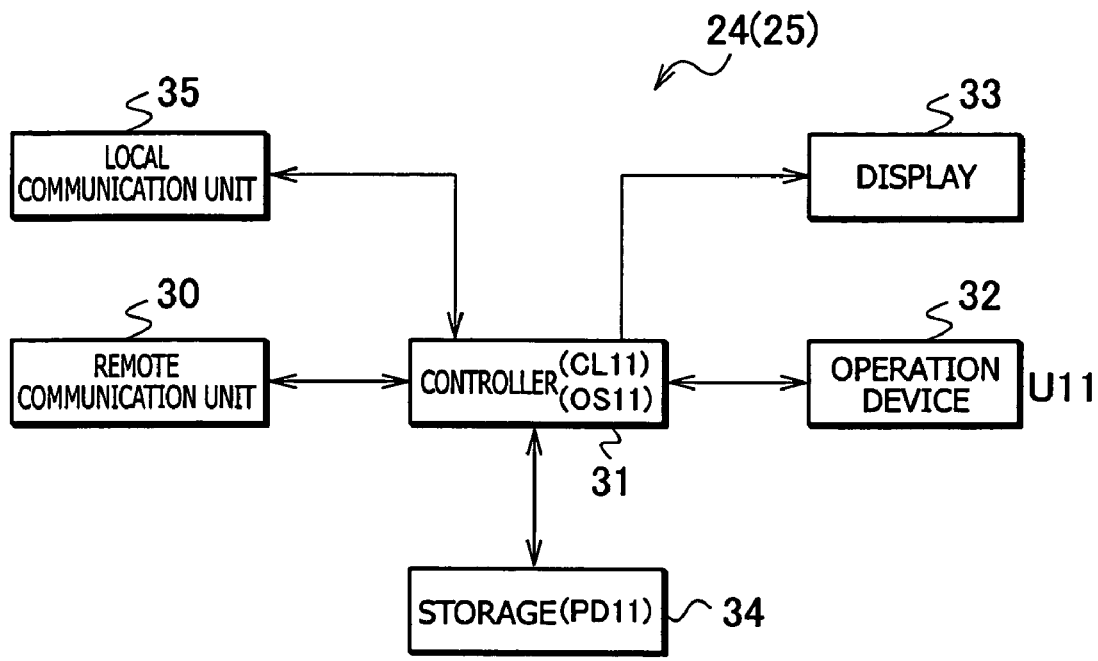
FIG. 6 is a schematic view exemplifying the configuration of main components of a personal computer employed in the embodiment of the present invention.

The internal configuration of the foregoing client terminal 24 is exemplified in FIG. 6. Though there is no problem if the client terminal 24 is provided as a dedicated terminal, the client terminal 24 in the present embodiment is provided as a stationary personal computer. Additionally, the internal configuration of the client terminal 25 may be the same as that shown in FIG. 6.

As shown in FIG. 6, the client terminal 24 is equipped with a remote communication unit 30, controller 31, operation device 32, display 33, storage 34, and local communication unit 35.

Of these components, the remote communication controller 30 functions as a unit for remote communication carried out via the printing network 20 and others and is in charge of execution of transmitting various data including a print job PJ11 (for example, corresponding to F of the print jobs A to H) and print job data PD11. The remote communication may be carried out with the use of a wired transmission path or a wireless transmission path. A transmission path in which both of a wireless transmission path and a wireless transmission path are mixed can be used for the remote communication. The issue about which of the wired transmission path or the wireless transmission path should be used concerns the physical layer of an OSI reference model. The reason is that it is enough for the remote communication if the connection relationship shown in FIG. 1 is established using the data link layer or layers higher than that in the OSI reference model.

By contrast, the local communication unit 35 functions as a unit for locally communicating (local communication) with a party to be communicated (in the present embodiment, the foregoing short-range wireless terminal 26A) in a direct manner, without passing any network.

Differently from the remote communication, the local communication has, due to its natures, a large influence on usability and other factors in the present embodiment. Therefore, as for the local communication, whether a path utilized on the physical layer of the OSI reference model is based on a wired method (wired transmission path) or a wireless method (wireless transmission path) is a significant issue.

In the case of the local communication, the wired method is realized by connecting wired transmission mediums, such as cables, with detachable type connectors, whereby local communication can be performed. Meanwhile, the wireless method is directed, in most cases, to the short-range wireless communication performed in a short range of over ten meters at most, and can be categorized into two methods on the difference of transmission mediums; one uses an electromagnetic wave and the other uses infrared rays.

Although the wired method is advantageous in some points such as no interference with other commutations, the wireless method is superior to the wired method in usability and others when considering that it is unnecessary to use the connectors. Of these two wireless methods, the method on the infrared rays is also advantageous in no interference with other communications, like the wired method, though it is limited to communication carried out in sight. In addition, the method of the infrared rays is also more excellent in usability than the wired method, because there is no necessity of loading the connectors.

In contrast, when using the method on the electromagnetic wave, it is not always clear how far the electromagnetic wave has arrived, on account of the transmission and diffraction phenomena of the electromagnetic wave. On top of it, the method on the electromagnetic wave may cause interference with other communications, but yet it can be said that the method on the electromagnetic wave is superior in usability to the infrared-ray communication, because it is not required to exactly make the infrared-ray port opposed to the party to be communicated, unlike the infrared-ray communication.

Thus, in the present embodiment, since the usability is the top priority, the local communication unit 35 is configured to perform the short-range wireless commutation on the electromagnetic wave.

Through the short-range wireless commutation carried between the local communication unit 35 and the short-range wireless terminal 26A, a job identifier JID1 described later is sent from the local communication unit 35 to the short-range wireless terminal 26A. A range where the short-range wireless communication can be executed provides a wireless connection range ER3.

The dimension of this wireless connection range ER3 is decided depending on some factors including transmission power of an electromagnetic wave on which the short-range wireless communication is performed. When this short-range wireless communication is in operation, the user U11 is also in the course of operating the operation device 32 of the client terminal 24, whereby a radius of about one meter is enough for the wireless connection range. If this wireless connection range ER3 is too large, the electromagnetic wave for the short-range wireless communication will raise the possibility of interference with various other electromagnetic waves, which includes an electromagnetic wave for short-range wireless communication carried out between other client terminals existing near the client terminal 24 and the user's short-range wireless terminal (not shown) and another electromagnetic wave for short-range wireless communication carried out between a printer existing near by (for example, the printer 23 may be placed close to the printer 24) and a short-range wireless terminal handled by another user. Therefore, it is preferable that the wireless connection range ER3 is reduced in the dimension.

The operation device 32 is operated by the user U11 to give user's instructions to the client terminal 24, which includes pointing devices, such as mouse and keyboard, for instance.

The display 33 acts as a displaying unit to display screens depending on functions provided by the foregoing client software CL11 and others. If an interface on the display is provided by a GUI (graphical user interface), a window (print control window) for inputting contents of control information included in the foregoing print job PJ11 and other pieces of information is displayed on the display 33 by the function of the client software CL. While viewing this displayed screen, the user U11 operates the operation device 22 so that the contents of control information included in the foregoing print job PJ11 and other pieces of information can be inputted.

The control information of the print job PJ11 can include various types of control information, many of which can be determined automatically. In cases where a plurality of printers including the printer 23, which are constructed similarly to the printer 23, are connected to the printing network 20, it is necessary to designate which printer to provide printed results, thus such designation information being one piece of control information. The contents of information indicative of designation of a desired printer are also reflected in the contents of the job identifier JID1.

The client software CL1 may be provided as a dedicated software to this printing, but in the case that the printing server 21 is able to function as a web server, a universal web browser can be utilized as the client software CL11. The controller 31 corresponds, from a hardware viewpoint, to a CPU (central processing unit) of the client terminal 24 and, from a software viewpoint, to a variety of programs, such as OS (operating system) and the client software CL11.

The storage 34 is provided, in terms of hardware, as storing resources composed of memory components that include a RAM (Random Access Memory) and hard disk, and in terms of software, as an element including a database and data of various files. Since the client software CL11, which is categorized into a program file, is also one of the various files, both of the OS and the client software CL11 fall into the storage 34 in the sense that they are classified on their physical entity.

In the storage 34 are stored data files such as files of image data composing the print job data PD11.

As described before, the internal configuration of the client terminal 25 may be the same as that of the client terminal 24, and may be formed as a notebook-size personal computer as shown in the figure, so that the client terminal 25 has mobility to some extent. It is therefore probable that the client terminal 25 is moved from one section to another section and connected to a printing server again. In such a case, there is a higher possibility that the printing servers to which the client terminal 25 is connected are changed one from anther (for example, from the printing server 22 to the printing server 21).

When giving greater importance to the mobility, it is highly possible that the remote communication from the client terminal 25 is carried out using the foregoing wireless transmission path on the physical layer of the OSI reference model.

Figure 7:
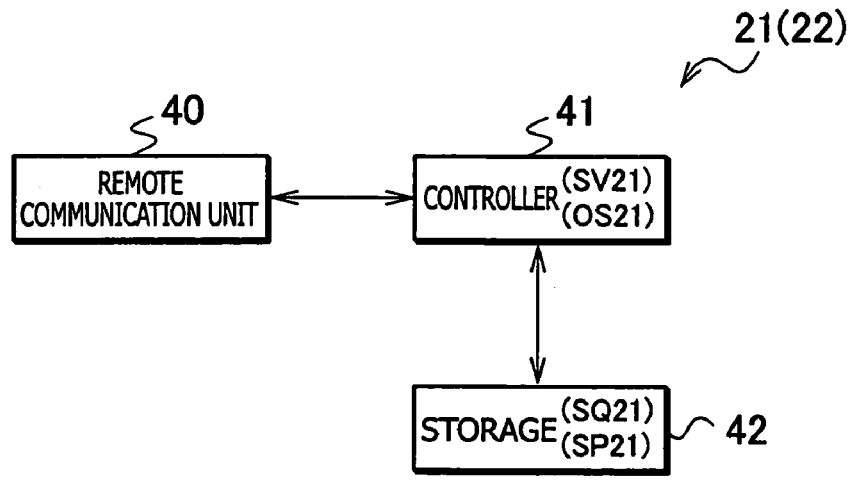
FIG. 7 is a schematic view exemplifying the configuration of main components of a printing server employed in the embodiment of the present invention.

On the other hand, the internal configuration of the foregoing printing server 21, which receives through the network the print job PJ 11, print job data PD11 and other data that have been transmitted from the client terminal 24 via the remote communication unit 30, is exemplified in FIG. 7. As to the internal configuration, the remaining printing server 22 may be configured in the same way as shown in FIG. 7.

As shown in FIG. 7, the printing server 21 is provided with a remote communication unit 40, controller 41 and storage 42.

Of these components, in terms of operations, the remote communication unit 40 corresponds to the foregoing remote communication unit 30, the controller 41 corresponds to the foregoing controller 31, and the storage 42 corresponds to the foregoing storage 34, respectively, thus being omitted from being explained in detail.

There is, however, one difference between the two printing servers in that the controller 41 does not have the function of the foregoing client software CL11, but has the function of server software SV21. The server software SV 21 has the capability of providing a printer sever function to the client software CL11 and the printer 23.

From the viewpoint of the server software SV21, the client is categorized into two types. One type, which is true of client terminals 24 and 25, is a print request type of client that transmits a print job and print job data for requesting the printing. The other, which is true of the printer 26, is a printing-performance type of client that urges transmission of the next print job and print job data by notifying that a margin has arose in the resources.

The server software SV21 has also a function for access control. Normally, the printing server 21 is used by a large number of users (one of them is the user U11). Allowing any user to access a variety of resources in the printing server 21 without any restrictions gives rise to inconveniences to other users' use, whereby reliability cannot be sustained. Therefore, the access control function is given to allow changes of only the order of print jobs mapped in the server-side print queue SQ21.

However, allowing any user to change the order of print jobs by using any terminal will cause trouble, so that the changes of such an order should be done in response to only the arrival of a genuine request (order change control signal FB1) coming from a printer (for example, the printer 23). If necessary, the order change control signal FB1 can be utilized to perform terminal authentication to check the validity of a terminal that transmitted the order change control signal FB1.

The controller 41 has the function of a server OS (OS21) that provides the serer software SV21 with services.

In cases where information about the foregoing designation of a printer is included in control information in a printer job, it is required that the server OS 21 executes job management by using, in part (part indicative of the designation of a printer), the description of this printer job.

Based on the results of job management, the printer server 21 decides that each print job (and print job data associated with the print job) should be transmitted to which printer.

The storage 42, which is different from the storage 34 of the client terminal (for example, client terminal 24) in the software structure, includes the foregoing print queue SQ21 and spooler SP21. The print queue SQ21 is established in a buffer of which reading technique is so-called "FIFO (Fast-In Fast-Out)" type.

FIFO is a reading technique for reading out information written per unit (in the present embodiment, each print job) in order of being written therein. The FIFO type of print queue can be realized by using hardware, but it is more frequent that such a print queue is realized in software by utilizing a list structure.

When receiving the order change control signal FB1 which will be detailed later, the server software SV 21 functions so that a print job (for example, the job PJ11) corresponding to the signal is searched in the server-side print queue SQ21 and then subjected to changes of its ranking (to locate at the head).

Figure 8:
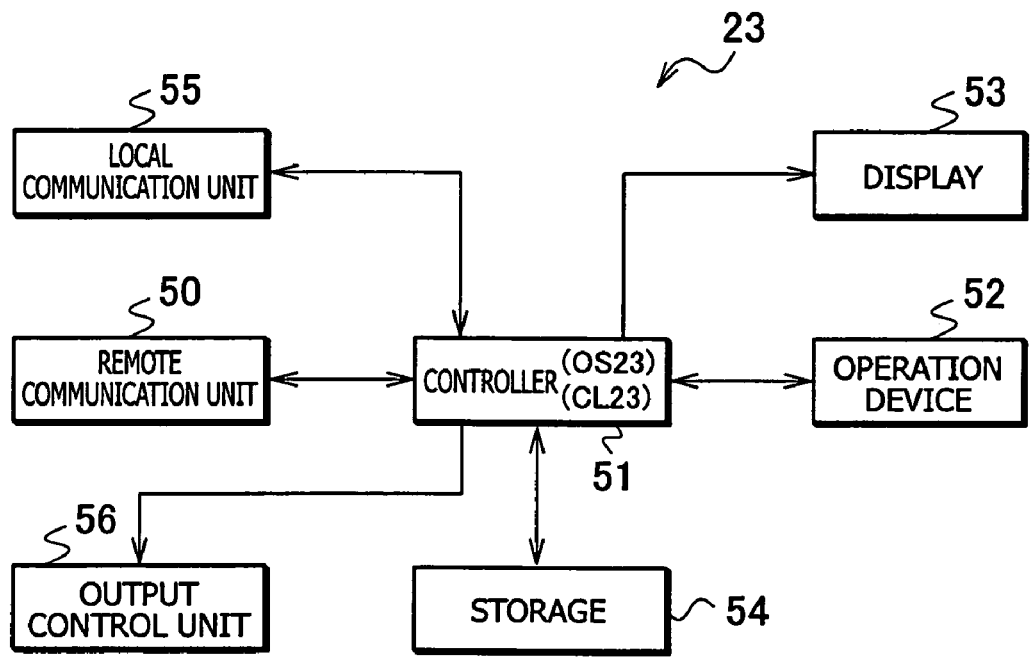
FIG. 8 is a schematic view exemplifying the configuration of main components of a printer employed in the embodiment of the present invention.

The internal configuration of the printer 23 is exemplified in FIG. 8. On occasions when printers (not shown) other than the printer 23 exist on the printing network 20, such printers may have the same internal configuration as that shown in FIG. 8.

In the configuration shown in FIG. 8, the printer 23 is provided with a remote communication unit 50, controller 51, operation device 52, display 53, storage 53, local communication unit 55, and printing output unit 56.

Of these components, in terms of functions, the remote communication unit 50 corresponds to the foregoing remote communication unit 30, the controller 51 to the forgoing controller 31, the operation device 52 to the foregoing operation device 32, the display 53 to the foregoing display 33, the storage 54 to the foregoing storage 34 (to the storage 42 rather than this storage 34), and the local communication unit 55 to the foregoing local communication unit 35, respectively. Hence, the components 50 to 55 will be omitted from being detailed.

However, one thing should be explained additionally about the remote communication unit 50. That is, in the case that there occurs a room in the processing capacity and memory capacity of the printer 23, the remote communication unit 50 functions so as to request the printing server (for example, the printing server 21) for sending the next print job and print job data to the printer and receiving the print job and print job data that have been sent from the printing server responsively to the request.

If the next print job and print job data come in salutations where there is no room in the memory capacity, there is a possibility that various kinds of drawbacks occur. Such drawbacks include the loss of information due to an overflow thereof and/or the loss of the print job and print job data that have arrived or print jobs and print job data stored already, which will cause a situation where a user (for example, the user U11) who made a request for printing cannot able to get printed results exactly corresponding the request. Therefore, to avoid such drawbacks, it is required that the above communication should be performed between the remote communication unit 50 and the printer server (for example, the printer server 21).

Further, processing which is characteristic of this printing system according to the present embodiment is carried out by the remote communitarian unit 50 such that the remote communication unit 50 makes the printer 23 transmit, to the printing server (for example, the printing server 21), an order change control signal FB1 that commands a change of the order of print jobs in the server-side print queue SQ21.

The change of the order is to forcibly and temporarily change the reading operations on the FIFO manner which allows print jobs (for example, including the print job PJ11) to be read out simply depending on the written order of the print jobs. Although changing the order can be done in various modes, the present embodiment adopts the mode of changing the ranking of a specified print job (for example, the print job PJ11) to the first position of the server-side print queue SQ21 (the print job at the first position is the next to be read out).

To change the order in this way requires that a desired one print job (for example, the print job PJ11) should be specified uniquely in the server-side print queue SQ2. This specification requires a job identifier JID1 obtained by communicating with the short-range wireless terminal 26A.

The job identifier servers as a piece of information to uniquely identify a desired print job (for instance, the print job PJ11) on the printing network 20. There can be provided a variety of kinds of methods of identifying print jobs, which means that practical contents of the job identifier JID1 can be determined in various modes.

For example, in cases where a print job is identified by specifying both of the user ID (determined in advanced) of the user U11 and information (i.e., an job ID) indicating that the user U11 issued a print job at what ranking, both of the user ID and the job ID become the contents of the job identifier JID1. In the present embodiment, however, an alternative way is adopted, wherein a terminal ID to identify a client terminal (for instance, the client terminal 24), a server ID to identify a printing server (for example the printing server 21), and the job ID are used in a combined manner to identify a print job.

Describing the server ID in the job identifier IJD1 enables the printer 23 to previously recognize a printing server to which the order change control signal FB1 is transmitted. Thus loads imposed on the processing of a printing server (for example, the printing server 21) and the printer 23 can be lessened, thus reducing traffic in communication, thus being efficient.

Various kinds of information can be utilized as the terminal ID. In cases where the printing network 20 is composed of a TCP/IP network, an IP address assigned to the client terminal 24 can be utilized. Alternatively, a hardware address (MAC address) of a LAN adopter loaded in the client terminal 24 can be utilized as well. Though the IP address, including the DHCP, assigned to the client terminal 24 may be subject to changing, the MAC address will not be changed, so that using the MAC address is advantageous for achieving the management with consistency.

The job identifier JID1 may be sent out separately from the order change control signal FB1, while the present embodiment is designed so that the job identifier JID1 is included in the order change control signal FB1.

It is the remote communication unit 50 that transmits the order change control signal FB1, wherein the transmission is done based on determination carried out by the client software CL2 described later.

The local communication unit 55 residing in the printer 23 is an element having the capability of acquiring the job identifier JID1 through the short-range wireless communication (local communication) with the foregoing short-range wireless terminal 26A.

Some user interfaces applicable to the short-range wireless terminal 26A require a condition that the user U11 performs any actions (transmission-permitting operations) (toward the short-range wireless terminal 26A or printer 23), before transmitting the job identifier JID1. By contrast, in the present embodiment, such transmission-permitting operations will be unnecessary.

In other words, when the short-range wireless terminal 26A moves, together with user's moves, into a predetermined print priority control range ER2 set around the printer 23, the communication between the short-range wireless terminal 26A and the local communication unit 55 is automatically started, without imposing any operation on the user U11. During the communication, the job identifier JID1 is transmitted and received, and then the communication is ended.

A wireless connection range ER1, which is set around the printer 23, corresponds to the foregoing wireless connection range ER3. The example shown in the figure shows a situation where the print priority control range ER2 is placed within the wireless connection range ER1. Alternatively, if necessary, the print priority control range ER2 can be the same in dimension as the wireless connection range ER1.

It is normal that the wireless connection range ER1 set around the printer 23 and the wireless connection range ER3 set around the client terminal 24 are made to agree with each other in their dimensions. If necessary, it is also possible that the wireless connection range ER1 is larger in dimensions than the range ER3, as long as consideration is given to some factors, such as the arrangement of an antenna for short-range wireless communication which is contained in the local communication unit 55. For example, a plurality of antennas are arranged at different positions within the printer 23 or given positions outside the printers 23 for the short-range wireless communication. In such a case, a wireless connection range is formed around each antenna, which is as large dimension as the wireless connection range ER1. Hence, combining those wireless connection ranges produced by the antennas will lead to an entire wireless connection range given to the printer 23. As the need arises, those plural antennas can be utilized for diversity reception.

How the local communication unit 55 in the printer 23 detects the presence of a short-range wireless terminal (for example, the wireless terminal 26A) within the foregoing range (for example, the range ER2) depends on practical functional specifications provided by short-range wireless communication to be adopted. By way of example, the following technique can be used.

To be specific, such a technique is realized with a master-slave type configuration, in which the local communication unit 55 of the printer 23 serves as a master and a local communication unit 60 in the short-range wireless terminal 26A (refer to FIG. 9) serves as a slave. In this configuring, as an example, the local communication unit 55 makes inquiries by broadcasting packets for a question (questioning packets), and then waits for a response (responding packets) to be returned in response to the inquiries. The questioning packets are broadcasted continuously, irrelevantly of whether or not there is a short-range wireless terminal (for example, the terminal 26A) at a short distance.

The arrival of the broadcasted questioning packets is physically limited within the wireless connection range ER1, while a range of arrival of the questioning packets to be sent out by the short-range wireless terminal 26A which has received the questioning packets is also approximately equal to the radius of this wireless connection range ER1. This means that, only if the conditions that the user U11 arrives within the wireless connection range ER1 and the short-range wireless terminal 26A is located within the wireless connection range ER1 are met, the responding packets are returned as valid responding packets. Hence, when receiving the responding packets, the local communication unit 55 is able to know that the short-range wireless terminal 26A has been present within the wireless connection range ER1.

As OS 23 with a function corresponding to the controller 51 of the printer 23, often employed is real-time OS that makes much account of real-time processing. This OS 23 is used under conditions different from the OS 11 installed in the client terminal 24 made of a personal computer, because the OS 23 has a lower degree of necessity of providing services to unknown applications.

It is required for the OS23 in the controller 51 to perform job management, when a print job (for example, the print job PJ11) included in the printers-side print queue SQ23 is read out for print processing.

Under this job management, almost all pieces of control information given to one print job (for example, the job PJ11) is used for carrying out various kinds of processing, which include pre-processing for preparing printing processing of print job data corresponding the print job, printing processing, and post-processing executed after the printing processing. In cases where a plurality of programs should be subjected to the printing processing, the control information about the foregoing printing processing includes about which order should be used to perform the group of programs. Incidentally, after the post-processing, the printing processing becomes ready for starting the next print job.

Further, the foregoing client software CL23 functionally corresponds to the controller 51 The client software CL23 is placed for the printer 23, which is one of the clients to the printing server 21.

It is more often that the display 53 of the printer 23 is formed into a display unit of which size is considerably smaller than the display 33 of the client terminal 24 that consists of a personal computer. However, the basic function of the display 53 is similar to that of the display 33.

The above is true of the operation device 52. In other words, it is frequent that the operation device 52 is, to a large extent, more compact than the operation device 32. The foregoing control panel 12A corresponds to this operation device 52.

In the storage 54, a spool and a print queue are memorized, like the storage 42 in the printing server 21. This spool forms the foregoing spool SP23, while this print queue forms the foregoing printer-side print queue SQ23.

The printing output unit 56 is a device to print out print job data on a given form in compliance with the foregoing print job.

Figure 9:
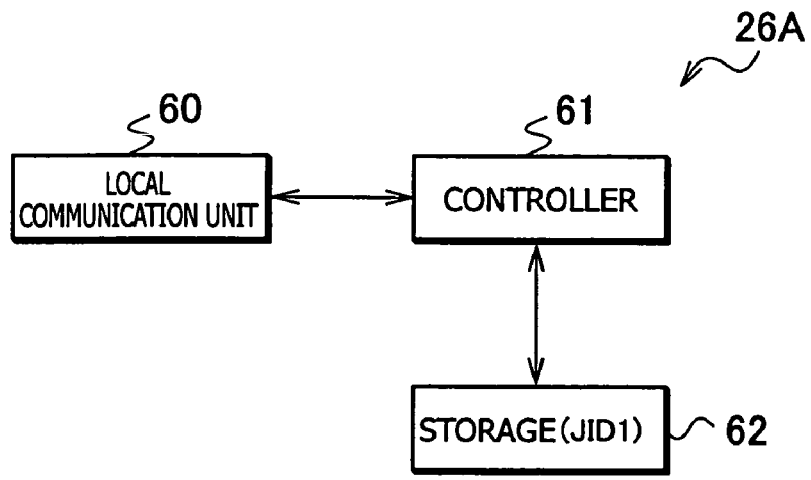
FIG. 9 is a schematic view exemplifying the configuration of main components of a name plate (short-range wireless terminal) employed in the embodiment of the present invention.

The internal configuration of the foregoing short-range wireless terminal 26A, which is responsible for short-range wireless communication between the printer 23 and the client terminal 24, is shown in FIG. 9. Incidentally, the short-range wireless terminal (not shown) embedded within the name plate 27 loaded on the user U12 may be internally configured in the same manner as that shown in FIG. 9.

In the configuration shown in FIG. 9, the short-range wireless terminal 26A is provided with a local communication unit 60, controller 61, and storage 62.

Of these components, the local communication unit 60 functionally corresponds to the foregoing local communication unit 35, the controller 61 to the foregoing controller 31, and the storage 62 to the foregoing storage 34, respectively, so their detailed explanations are omitted.

There are some additional features that should be mentioned about this short-range wireless terminal 26A. One of those features is as follows. It is required that this terminal 26A be configured, as a whole, into an extremely tiny device, in the form of an IC chip or others.

A further feature is that this short-range wireless terminal 26A is configured to have considerably limited functions alone. That is, the terminal temporarily memorizes the foregoing print identifier JID1 that has received from the client terminal 24 and, when the terminal is moved within the print priority control range ER2 set around the printer 23, the terminal sends out the job identifier JID1 to the printer 23. Accordingly, it is enough that the function that each of the components 60 to 62 should have is also limited.

For example, the storage 62 is sufficient if it has a memory capacity that can memorize only data indicative of the job identifier JID1.

The operations of the printing network 20 according to the present embodiment, which has the configurations described above, will now be explained.

In the present embodiment, exemplified is a situation under which the user U11 operates the client terminal 24 to request the printing server 21 for printing, and then moves toward the primer 23 to get printed output results.

When the user U11 operates the client terminal 24 to make a request for printing, a print job PJ11 and print job data PD11 according to the printing request are supplied to the printing server 21. Responsively to this reception, the printing server 21 adds the print job PJ11 to the end of the server-side print queue SQ21 and then stores the print job data PD11 in the spooler SP21.

In situations where the user U11 operates the client terminal 24 for the printing request, the short-range wireless terminal 26A within the name plate 26 engages in short-range wireless communication with the client terminal 24, with the result that, for example, according to the contents of control information and others that the user U11 entered into the print-control window, the terminal 26A receives the foregoing job idenitifier JID1 for memorization therein. As described, the job identifier JID1 is a piece of information capable of identifying the print job PJ11 uniquely on the printing network 20.

After the printing request, the user U11 moves toward the printer 23 to enter the wireless connection range ER1 and the print priority control range ER2, in turn, set to encircle the printer 23. While the user passes such ranges, the short-range wireless terminal 26A performs short-range wireless communication with the printer 23 in an automatic fashion, during which time the terminal 26A transmits the job identifier JID1 to the printer 23.

In response to the reception of the job identifier JID1, the printer 23 searches the printer-side print queue SQ23 owned by the printer 23 for whether or not the print job PJ11 specified by the job identifier JID1 is present in the printer-side print queue SQ23 (jog search).

When it is found through this job search that the print job PJ11 is present in the printer-side print queue SQ23, the ranking of this print job PJ11 is changed to locate at the first ranking in the printer-side print queue SQ23. Of course, when the print job PJ11 positions at the first ranking by coincidence, it will not be required to perform such order changes.

In cases where this job search reveals the presence of the print job PJ11 in the printer-side print queue SQ23, it is unnecessary for the printer to send out the foregoing order change control signal FB1 to the printing server 21, because the order change processing is brought to an end only within the printer 23.

Since the order of the printer-side print queue SQ23 is changed so that the print job PJ11 comes to the first ranking thereof, the print job PJ11 will be read out from the printer-side print queue SQ23 at the next reading, whereby the print job data corresponding to the print job PJ11 is subjected to the next printing for obtaining its printed output. Hence, as desired, the user U11 is able to acquire printed output results with less waiting time than the conventional.

On the other hand, when the job search shows that the print job PJ11 is not present in the printer-side print queue SQ23 of the printer 23, the determination that the print job PJ11 is present in the printing server (in this example, the printing server 21) can be made based on the contents of the job identifier JID1. Hence, the printer 23 operates to send out the foregoing order change control signal FB1 to the printing server 21.

Suppose that, when the order change control signal FB1 has been transmitted and received, the printing server 21 has the servers-side print queue SQ21 and the printer 23 has the printer-side print queue SQ23, both statuses can be illustrates by ST1 in FIG. 4. In the subsequent processing, as the time elapses, the status of each queue advances in the order of ST1, ST2, ST3, to ST4.

In the status of ST1 in which a print job F corresponds to the print job PJ11, there are five print jobs A to E before the print job F, whilst two print jobs G and H exist after the print job F. Of these jobs, the print jobs A to E have already been requested for printing from (the client terminal 24 or) other client terminals, prior to the request for the print job F (PJ11) issued by the user U11 who operated the client terminal 24.

By contrast, the two print jobs G and H are requested for printing from (the client terminal 24 or) other client terminals, after the request for the print job F issued by the user U11 who operated the client terminal 24.

If the queues are kept without any changes, the print job F undergoes reading only after the five print jobs A to E have been read out, so that the user U11 should wait until the those five jobs have been read out and their corresponding print job data are subjected to printing. However, thanks to the processing to respond to the order change control signal FB1, the printing server 21 is entitled to change the ranking of the print job F to a position in front of the print job A locating at the head, that is, to the first ranking in the server-side print queue SQ21. Through this changing operation, both of the server-side print queue SQ21 and the printer-side print queue SQ23 are transferred to the statuses shown by ST2. Incidentally, in cases where the print job F locates at the head of the queue by coincidence in the status shown by ST1, it is not necessary to perform the change control.

Figure 3:
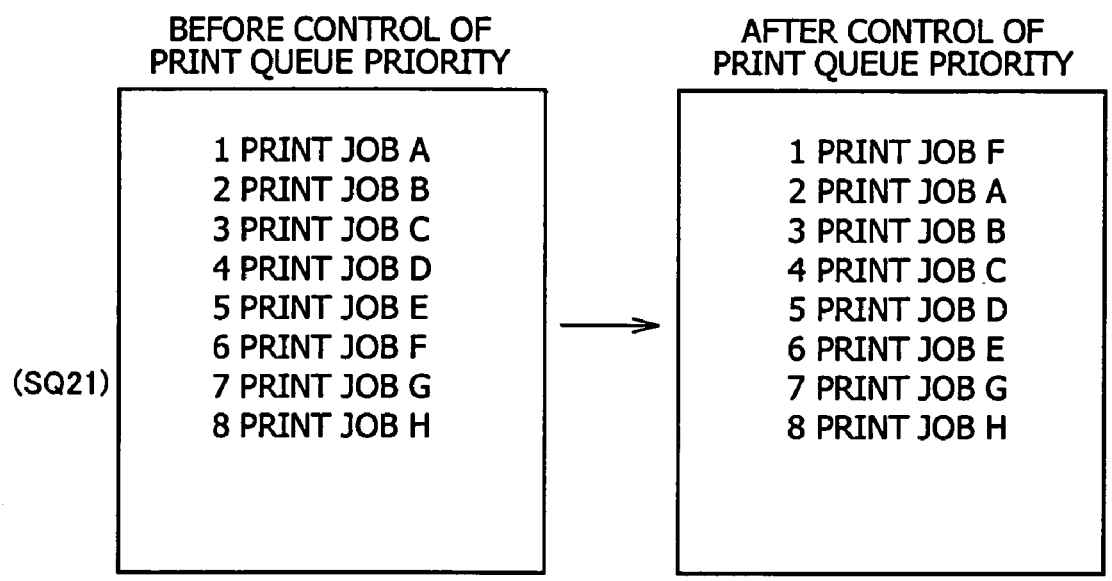
FIG. 3 illustrates the operation carried out in the embodiment according to the present invention.

When attention is paid to only the servers-side print queue SQ21, a transfer from its status shown by ST1 to its status shown by ST2 can be illustrated as in FIG. 3.

In the status shown by ST2 in FIG. 4, the next to be read out from the server-side print queue SQ21 is the print job F. When this reading has been carried out, both of the print job F and the print job data PD11 corresponding to the print job F are sent to the printer 23.

In response to this reception, the printer 23 stores the print job data in the spooler SP23 and adds the print job F to the end of the printer-side print queue SQ23. Thus, the print queues SQ21 and SQ23 on the server and printer sides provide their statuses as shown by ST23 in FIG. 4.

In the status shown by ST3, in the printer-side print queue SQ23, there are five print jobs I to M before the print job F.

These five print jobs I to M have already been supplied from either the printing server 21 or 22 to the printer 23 prior to establishment of the status ST1.

If this status do not experience any order change control, the print job F will be read out only after the reading of the five print jobs I to M (i.e., after the printing corresponding to the five print jobs has been completed), so that the user U11 is forced to wait until the completion of printing of the preceding jobs.

A period of time required for getting printing results corresponding to each print job is not always constant, that is, depends on each print job. Additionally, one print job may request printing of dozens of sheets or more. It is therefore probable that the user U11 has to wait for a long time.

Consequently, the printer 23, which received the print job F and added it to the end of the printer-side print queue SQ23, changes the order of the printer-side print queue SQ23 so that the ranking of the print job locate at the head of the queue 23. The statuses of the sever-side and printer-side print queues SQ21 and SQ23 can therefore be expressed by ST.

Thus, the next to be read out from the printer-side print queue SQ23 is the print job F, so that the printing specified by the print job F can be carried out. Namely, the print job data PD11 is subjected to the printing to provide printed results.

As a result, only making a simple move of the user u11 to the printer 23 makes it possible to obtain the printed output results of a job to be desired in a quick manner.

In the case that users (for example, the user u12) other than the user u11 want to obtain printed output results, the same operations as the above will be performed.

In addition, if the foregoing job search shows that the print job F is present in the printer-side print queue SQ23, the operations internally carried out in the printer 23 are the same as the operations required to transfer from the status ST3 to the status ST4.

Several alternative schemes can be provided as follows. At the time when the printer 23 receives the print job F after having transmitted the order change control signal FB1, the printer 23 is able to, in principle, determine that the print job F in the printer-side print queue SQ23 is the top priority to be processed. Hence, if possible when considering the functional specifications of an actual printer, the print job F may be added to the head of the printer-side print queue SQ23, not to the end thereof, in cases where the print job F is added to the queue SQ23 for the first time. In such a case, the status ST3 is omitted, thus directly transferring from the status ST2 to the status ST4.

Further, instead of the scheme in which the job identifiers JID1 of all printing requests is allowed to be memorized by the short-range wireless terminal 26A without any limitation, a further scheme can be adopted, where the job identifier JID1 is allowed to be selectively memorized if the user U11 operates for that at the client terminal 24; that is, the job identifiers JID1 of specific printing requests are allowed to be memorized into the short-range wireless terminal 26A, but those of the other printing requests are not.

When such a function is given to the client terminal 24, the user U11 is able to quickly obtain printed output results for only part of a plurality of printing requests done by the user U11, thus being convenient.

Furthermore, a user interface to realize the above function on the job identifier can also be mounted to the short-range wireless terminal 26A or the printer 23. If such a user interface is adopted, a selection can be made between priority-given print jobs and ordinary print jobs with no priority, at a time when the job identifier JID1 is transmitted from the short-range wireless terminal 26A (the job identifiers JID1 of all printing requests are once memorized in the terminal 26A), or the job search or order change control signal FB1 is transmitted.

As clear from the explanation which have been made so far, the present embodiment enables the user (for example, the user U11) to obtain printed output results more quickly than the conventional, thereby providing higher convenience and flexibility.

Incidentally, the name plates 26 and 27 used in the above embodiment can be replaced by other communication terminals with mobility. By way of example, such available replacements are mobile phones in which a short-range wireless communication facility is provided.

Still, it is not necessary for the name plates 26 and 27 to have the short-range wireless communication function by themselves. In short, because it is sufficient that the current positions of users including the users U11 and U12 can be measured at a certain level of accuracy and its measurement results can be sent to the printer 23, the name plates may be omitted from the printing system, provided that the printing network 20 is associated with an external position measurement system. In such a case, it is still preferred that means for transmitting the job identifier JID1 to the printer 23 is provided. If such transmitting means is not provided, the user is demanded to enter information corresponding to the job identifier JID1 into the printer 23 by oneself.

Further, if a plurality of short-range wireless terminals (for example, the terminals 26A and 27A) comes into the range ER2 almost simultaneously, a priority can selectively be given to the terminal that first arrived in the range, by way of example. It is preferred to have a selection scheme in such a case.

In the foregoing embodiment, the change and control of the order of print jobs have been carried out every print job regarded as one unit for printing processing. If necessary, such control may be conducted on a unit basis smaller than one print job.

For example, even when a desired print job is changed to have the top priority in the printer-side print queue SQ23, there is a possibility that another job have already been read out from the printer-side print queue SQ23 at that order-changed time and is in printing for providing printed outputs. And such a print job may occupy an input/output unit (for example, the printing output unit 56) for a long time by printing, for example, 100 sheets (and the first several sheets have already been printed at the time when the above order change is issued).

In this case, waiting for the print job currently under execution and then executing the desired print job of which ranking has been changed to the head of the queue SQ23 results in that the user (for example, the user U11) who has already come near the printer 23 has to wait for a long time. However, the currently executed print job can be interrupted temporarily, while the ranking-changed print job can be executed ahead of the rest of the former print job, with the result that a waiting time for the user U11 who came to the printer 23 can be shortened without failure.

Moreover, regardless of the modes explained in the foregoing embodiment, each of the server-side print queue and/or printer-side print queue is not always limited to one in number. By way of example, the present invention is applicable to a configuration where a plurality of quality classes are defined and different queues are provided class by class (for example, the higher the quality class, the higher the priority for reading out print jobs in each queue). In this case, plural queues are formed in one printing server (for example, the printing server 21) and/or one printer (for example, the printer 23).

Although the foregoing explanations have been given to accomplish the present invention mainly using the software processing, it is of course possible that the present invention is reduced into practice using hardware configurations.

What is claimed is:

1. A printing system built on a predetermined network in which a printing apparatus receives a print job requested by a print request terminal via a printing server and processes the print job, thus performing printing corresponding to the print job, comprising:

a printing server comprising:

a first-in first-out type of server-side job buffer portion in which a server-side queue for the print job is formed to temporarily memorize the print job in the order of arrival of the print job requested by the print request terminal; and a server-side buffer control portion for changing the order of the print job memorized in the server-side queue in response to an order change control signal coming from the printing apparatus:

a printing apparatus comprises:

an event detection portion for detecting an occurrence of a predetermined event; and an order change request portion for transmitting the order change control signal in cases where the event detection portion detects the event, wherein the order change control signal is utilized to perform terminal authentication to check a validity of a terminal that transmitted the order change control signal, and whereby the print job read out from the server-side job buffer portion in the order of the print job memorized in the server-side queue is transmitted to the printing apparatus; and a mobile communication terminal being able to move together with a user who requests for the print job by operating the print request terminal and having a first wireless communication portion for performing wireless communication, wherein the event is defined as an arrival of the mobile communication terminal within a predetermined terminal search area defined around a location of the printing apparatus, wherein a change in the order in the server-side queue is to change the order so that a specified print job is located at the head of the server-side queue, wherein if a plurality of mobile communication terminals, having the first wireless communication portions, come into a print priority control range almost simultaneously, a priority is selectively given to the mobile communication terminal that arrives first in the print priority control range, wherein the mobile communication terminal comprises a job identification information memorizing portion for memorizing job identification information for uniquely identifying the print job on the network, wherein the printing apparatus comprises a second wireless communication portion for receiving the job identification information from the first wireless communication portion of the mobile communication terminal, and whereby, in cases where the printing apparatus transmits the order change control signal, the job identification information is utilized to specify a print job to be changed in the order of the print job memorized in the server side queue.

2. The printing system according to claim 1, where the mobile communication terminal comprises a job identification information acquiring portion for acquiring, in cases where the user operates the print request terminal to request a print job, the job identification information of the print job from the print request terminal.

3. The printing system according to claim 1, wherein the printing apparatus comprises a first-in first-type of printing-apparatus-side job buffer portion in which a printing-apparatus-side queue for the print job is formed to temporarily memorize the print job transmitted from the printing server in the order of arrival of the print job and a printing-apparatus-side buffer control portion for changing, in cases where a print job of which order in the server-side queue is changed at the head thereof arrives together with the order change control signal, the order of the print job memorized in the printing-apparatus-side queue immediately after the arrival so that the last print job in the printing-apparatus-side queue is located at the head thereof.

4. The printing system according to claim 1, wherein the printing server comprises an access control portion for permitting only a change in the order of the print job memorized in the server-side queue in response to the request from the printing apparatus.

5. A printing apparatus, operable in a predetermined network, for receiving from a printing server a print job sent from a print request terminal to the printing server and performing printing corresponding to the print job, the printing apparatus comprises:

an event detection portion for detecting an occurrence of a predetermined event;

an order change request portion for transmitting an order change control signal in cases where the event detection portion detects the event, wherein the order change control signal is utilized to perform terminal authentication to check a validity of a terminal that transmitted the order change control signal, whereby the order change control signal is used to change the order of the print order memorized in a server side queue, wherein the event is defined as an arrival of a mobile communication terminal within a predetermined terminal search area defined around a location of the printing apparatus, the mobile communication terminal being able to move together with a user who requests for the print job by operating the print request terminal and having a first wireless communication portion for performing wireless communication, wherein a change in the order in the server-side queue is to change the order so that a specified print job is located at the head of the server-side queue, and wherein if a plurality of mobile communication terminals, having the first wireless communication portions, come into a print priority control range almost simultaneously, a priority is selectively given to the mobile communication terminal that arrives first in the print priority control range; and a second wireless communication portion for receiving job identification information from the first wireless communication portion of the mobile communication terminal, the job identification information being, for identifying uniquely the print job on the network, and whereby, in response to transmitting the order change control signal, the job identification information is utilized to specify a print job to be changed in the order of the print job memorized in the server side queue.

6. The printing apparatus according to claim 5, comprising a first-in first-type of printing-apparatus-side job buffer portion in which a printing-apparatus-side queue for the print job is formed to temporarily memorize the print job transmitted from the printing server in the order of arrival of the print job and a printing-apparatus-side buffer control portion for changing, in cases where a print job of which order in the server-side queue is changed at the head thereof arrives together with the order change control signal, the order of the print job memorized in the printing-apparatus-side queue immediately after the arrival so that the last print job in the printing-apparatus-side queue is located at the head thereof.

7. A printing method, operable in a predetermined network, by which a printing apparatus receives a print job requested by a print request terminal via a printing server and processes the print job, thus performing printing corresponding to the print job, the printing method comprising the steps of:

in the printing server, the printing server memorizes temporarily the print job requested by the print request terminal into a first-in first-out type of server-side job buffer portion in the order of arrival of the print job, whereby a server-side queue for the print job is formed;

in the printing apparatus, the printing apparatus transmits the order change control signal from an order change request portion in cases where an event detection portion detects a predetermined event, wherein the order change control signal is utilized to perform terminal authentication to check a validity of a terminal that transmitted the order change control signal;

in the printing server that receives the order change control signal, a server-side control portion changes the order of the print job memorized in the server-side queue in response to the order change control signal and transmits to the printing apparatus a particular print job read from the print job memorized in the server-side job buffer portion in the changed order of the print job, wherein a mobile communication terminal, which is movable together with a user who requests for the print job by operating the print request terminal, is subjected to wireless communication through a first wireless communication portion, wherein the event is defined as an arrival of the mobile communication terminal within a predetermined terminal search area defined around a location of the printing apparatus, wherein a change in the order in the server-side queue is to change the order so that a specified print job is located at the head of the server-side queue, wherein if a plurality of mobile communication terminals, having the first wireless communication portions, come into a print priority control range almost simultaneously, a priority is selectively given to the mobile communication terminal that arrives first in the print priority control range;

in the mobile communication terminal, a job identification information memorizing portion memorizes job identification information for uniquely identifying the print job on the network; and in the printing apparatus, a second wireless communication portion receives the job identification information by performing wireless communication with the first wireless communication portion of the mobile communication terminal, and whereby, in cases where the printing apparatus transmits the order change control signal, the job identification information is utilized to specify a print job to be changed in the order of the print job memorized in the server side queue.

8. The printing method according to claim 7, wherein in the mobile communication terminal, in cases where the user operates the print request terminal to request a print job, a job identification information acquiring portion acquires the job identification information of the print job from the print request terminal.

9. The printing method according to claim 7, wherein in the printing apparatus, a first-in first-type of printing-apparatus-side job buffer portion temporarily memorizes the print job transmitted from the printing server in the order of arrival of the print job and a printing-apparatus-side buffer control portion changes, in cases where a print job of which order in the server-side queue is changed at the head thereof arrives together with the order change control signal, the order of the print job memorized in the printing-apparatus-side queue immediately after the arrival so that the last print job in the printing-apparatus-side queue is located at the head thereof.

10. The printing method according to clam 7, wherein in the printing server, an access control portion permits only a change in the order of the print job memorized in the server-side queue in response to the request from the printing apparatus.

11. A printing server, operable in a predetermined network, for memorizing temporarily a print job requested by a print request terminal and supplying the print job to a printing apparatus to make the printing apparatus perform printing corresponding the print job, the printing server comprising:

a first-in first-out type of server-side job buffer portion in which a server-side queue for the print job is formed to temporality memorize the print job in the order of arrival of the print job requested by the print request terminal;

a server-side buffer control portion for changing the order of the print job memorized in the server-side queue in response to an order change control signal coming from the printing apparatus, wherein the order change control signal is utilized to perform terminal authentication to check a validity of a terminal that transmitted the order change control signal, thereby transmitting to the printing apparatus the print job read out from the server-side job buffer portion in the order of the print job memorized in the server-side queue; and, a mobile communication terminal being able to move together with a user who requests for the print job by operating the print request terminal and having a first wireless communication portion for performing wireless communication, wherein an event is defined as an arrival of the mobile communication terminal within a predetermined terminal search area defined around a location of the printing apparatus, wherein a change in the order in the server-side queue is to change the order so that a specified print job is located at the head of the server-side queue, wherein if a plurality of mobile communication terminals, having the first wireless communication portions, come into a print priority control range almost simultaneously, a priority is selectively given to the mobile communication terminal that arrives first in the print priority control range, wherein the mobile communication terminal comprises a job identification information memorizing portion for memorizing job identification information for uniquely identifying the print job on the network, wherein the printing apparatus comprises a second wireless communication portion for receiving the job identification information from the first wireless communication portion of the mobile communication terminal, and whereby, in cases where the printing apparatus transmits the order change control signal, the job identification information is utilized to specify a print job to be changed in the order of the print job memorized in the server side queue.

12. The printing system according to claim 1, wherein a currently executed print job is temporarily interrupted while a ranking-changed printed job is executed ahead of other print jobs memorized in the server side queue.

13. The printing apparatus according to claim 5, wherein a currently executed print job is temporarily interrupted while a ranking-changed printed job is executed ahead of other print jobs memorized in the server side queue.

14. The printing method according to claim 7, further comprising temporarily interrupting a currently executed print job while a ranking-changed printed job is executed ahead of other print jobs memorized in the server side queue.

15. The printing server according to claim 11, wherein a currently executed print job is temporarily interrupted while a ranking-changed printed job is executed ahead of other print jobs memorized in the server side queue.

* * * * *